United States Patent [19]

Ashtiani-Zarandi et al.

[11] Patent Number: 5,616,293

[45] Date of Patent: *Apr. 1, 1997

[54] RAPID MAKING OF A PROTOTYPE PART OR MOLD USING STEREOLITHOGRAPHY MODEL

[75] Inventors: Mansour Ashtiani-Zarandi, Birmingham; David G. Hlavaty, Northville, both of Mich.

[73] Assignee: General Motors Corporation, Detroit, Mich.

[*] Notice: The portion of the term of this patent subsequent to Mar. 3, 2015, has been disclaimed.

[21] Appl. No.: 399,350

[22] Filed: Mar. 3, 1995

[51] Int. Cl.$^6$ .......................... B29C 33/40; B29C 35/08; B29C 41/02
[52] U.S. Cl. .......................................... 264/401; 264/221
[58] Field of Search ...................................... 264/221, 401

[56] References Cited

U.S. PATENT DOCUMENTS

| 4,844,144 | 7/1989 | Murphy et al. ............... 264/401 X |
| 5,256,340 | 10/1993 | Allison et al. .................... 264/401 |

FOREIGN PATENT DOCUMENTS

| 484183 | 5/1992 | European Pat. Off. . |
| 590957 | 4/1994 | European Pat. Off. . |
| 649691 | 4/1995 | European Pat. Off. . |
| 1330519 | 9/1973 | United Kingdom . |
| WO90/1727 | 2/1990 | WIPO . |
| 92/18323 | 10/1992 | WIPO . |

OTHER PUBLICATIONS

Abstract of Japan 5–24,118 (Published Feb. 2, 1993).
Abstract of Japan 5–131,244 (Published May 28, 1993).
Abstract of Japan 6–297,251 (Published Oct. 25, 2994).

*Primary Examiner*—Leo B. Tentoni
*Attorney, Agent, or Firm*—Charles E. Leahy

[57] ABSTRACT

A structural prototype of the component part is made by first creating a model of the part which is of cured resin and has a network of interconnected supporting members defining the shape of the part and leaving channels between the supporting members to drain away uncured resin from the model. A hardenable structural material is infiltrated into the channels of the model and cured so that the resin model has become reinforced to provide a structural model of the component part. The hardenable structural material may be a mixture of powdered graphite and resin which is cured by heat. The heat may be sufficient to both cure the hardenable structure material and burn away the cured resin of the model so that the component part is then comprised of the hardened structural material having a network of channels therein where the cured resin of the model has been burned away. The model can then be further strengthened by filling the network of channels with a suitable hardenable material. The method can also be used to make a mold to be used in making a molded component.

8 Claims, 5 Drawing Sheets

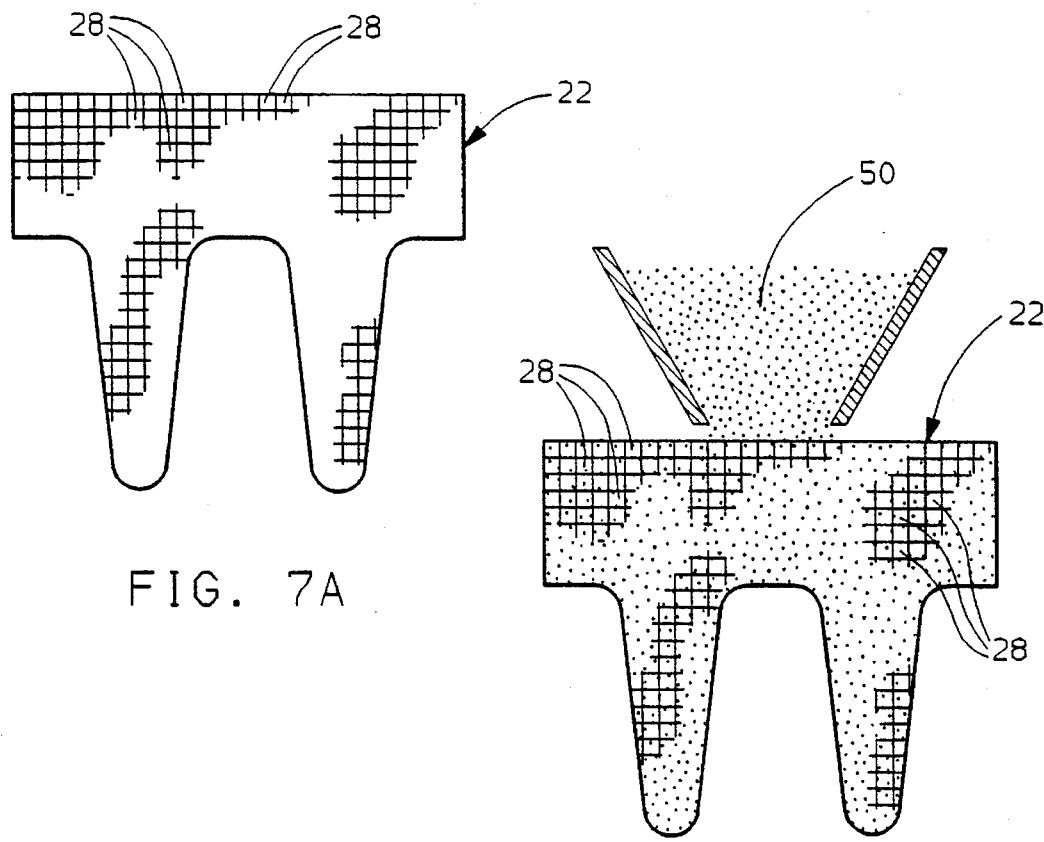
FIG. 7A
FIG. 7B
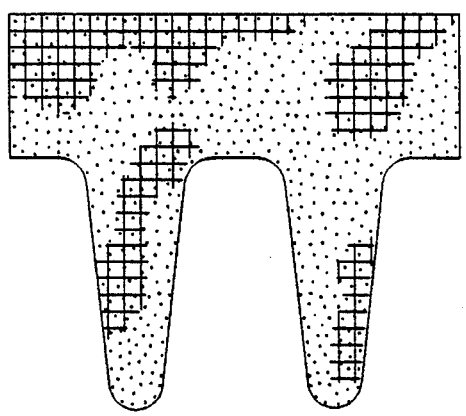
FIG. 7C
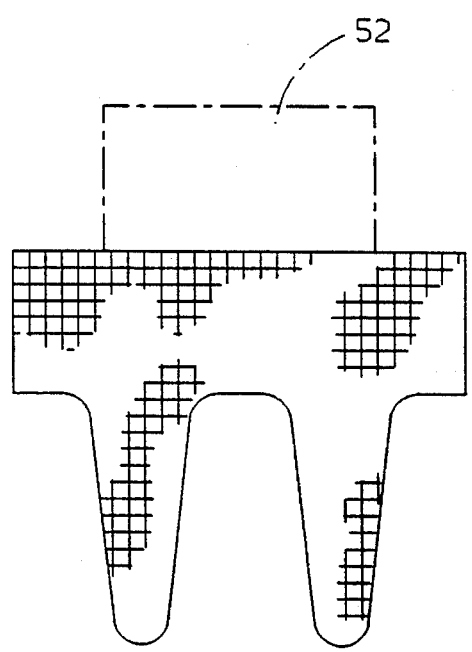
FIG. 7D

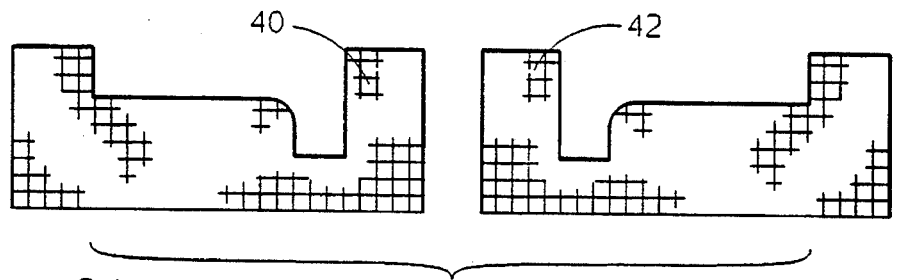
FIG. 8A
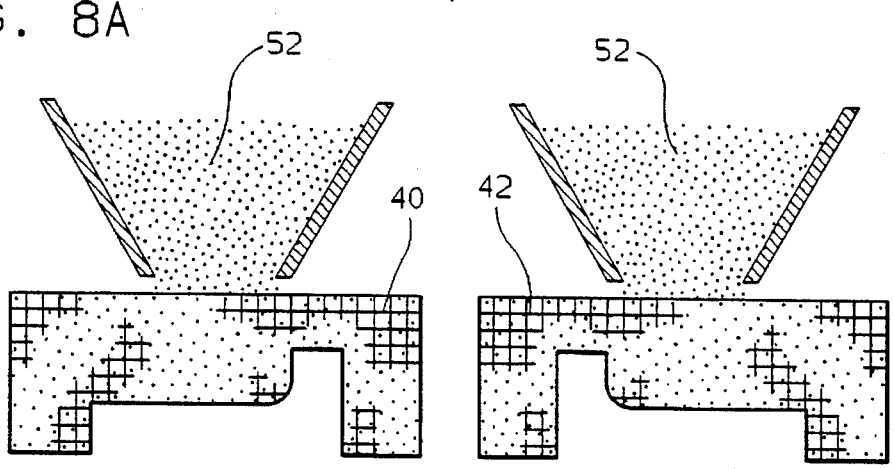
FIG. 8B
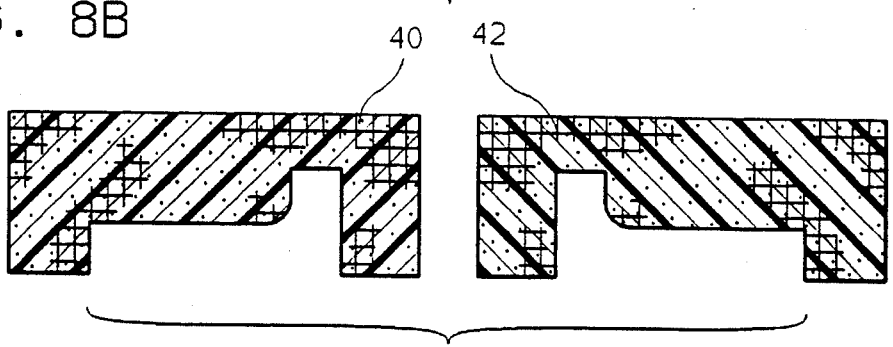
FIG. 8C
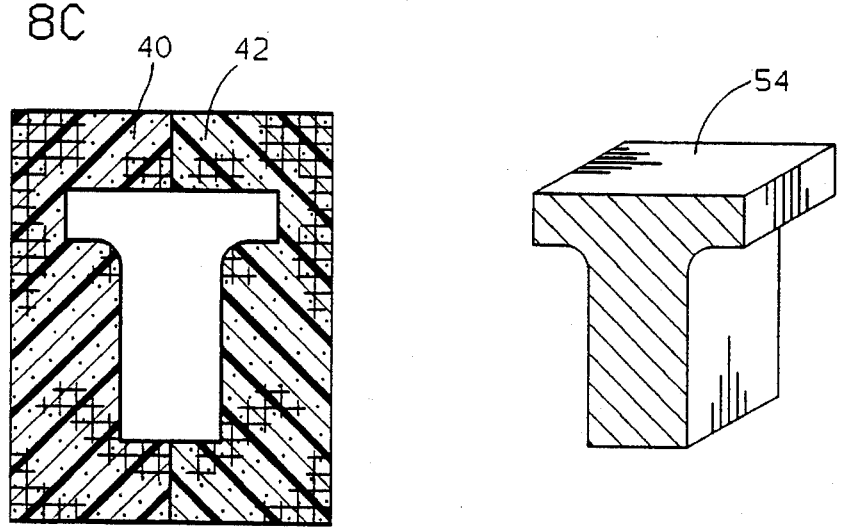
FIG. 8D
FIG. 9

5,616,293

RAPID MAKING OF A PROTOTYPE PART OR MOLD USING STEREOLITHOGRAPHY MODEL

The invention relates to a method by which a stereolithographic resin model can be employed to rapidly make a relatively high strength and durable prototype part and/or mold.

BACKGROUND OF THE INVENTION

It is well known to produce three-dimensional objects, such as prototype parts, by use of the process known as stereolithography. In stereolithography an elevator is suspended in a vat of liquid resin. A laser beam is manipulated by computer control to cure the resin. The laser beam is traversed across bath and the elevator is successively lowered into the bath to provide step-wise laminar build up of the shape of the desired prototype part. When the desired three-dimensional shape has been formed, the prototype part is raised out of the bath by the elevator.

This stereolithography process is well known and is widely used for making plastic models of component parts for the automotive, aircraft and electronics industries.

One shortcoming of the stereolithographically produced resin models is that the resins employed have considerably less strength than the strength of the materials such as steel, aluminum or plastic which will be used to manufacture the final component. Accordingly, heretofore, the parts manufactured by the stereolithography have generally been limited to use a visualization model to verify the production intent, rather than permitting use as a structural model which can be assembled into a finished product and evaluated for functionality.

The prior art has also recognized that a stereolithographically produced resin plastic model can be used to produce a sample part by investment casting. In this process, the resin model becomes the pattern for the investment processing. Wax gates and vents are attached onto the resin model to form the investment pattern. The pattern is then dipped in a ceramic slurry and cured. An autoclave or other high temperature apparatus is then used to melt away the wax and burn away the resin model. The ceramic mold then can be filled with molten metal such as aluminum to make a high strength functional component part.

In practicing the aforedescribed investment casting process using the resin model, the industry has discovered that the rapid expansion of the resin model during the burning away process has led to stress cracking of the ceramic mold. Accordingly, the industry has developed a process by which the resin model has only a thin outer wall while the internal volume thereof is defined by interconnected support members of very thin cross-section. In this way, the supporting members will collapse readily when subjected to high temperature and will not impose excessive stress on the ceramic mold.

Thus, in view of the above, it will be understood that the industry has developed techniques for effectively using a stereolithographically reproduced resin model to make a pattern for investment casting of an aluminum or other metal prototype part. The metal prototype part can be tested to confirm the functionality of the part, as well as visualize the design of the product.

It would be desirable to further improve the prototyping process by eliminating the need to investment cast prototype parts from the resin model in order to produce a high strength structural part.

SUMMARY OF THE INVENTION

The present invention provides an improved method for rapidly making a prototype part or mold using a stereolithography model. According to the invention, a structural prototype of the component part is made by first creating a cured resin model of the part. The resin model has a network of interconnected supporting members defining the shape of the part and leaving voids between the supporting members to drain away uncured resin from the model.

After the model is fully cured and the uncured resin drained away, a hardenable structural material is infiltrated into the voids of the model. The hardenable structural material is cured so that the resin model has become reinforced to provide a structural model of the component part. The hardenable structural material may be a mixture of powdered graphite and resin which is cured by heat. If desired, the heat may be sufficient to both cure the hardenable structure material and burn away the cured resin of the model so that the component part is then comprised of the hardened structural material having a network of channels therein where the cured resin of the model has been burned away. The model can then be further strengthened by filling the network of channels with a suitable hardenable material.

The method can also be used to make a mold to be used in making a molded component. In this case, stereolithography is used to create a cured resin model of the mold. The mold has a cavity having the shape of the desired part. The model has a network of supporting members defining the shape of the mold and voids between the supporting members to drain away the cured resin. The hardenable structural material is then infiltrated into the voids and cured. After curing, the mold can be filled with suitable molding material such as a molten metal, plastic resin, etc.

BRIEF DESCRIPTION OF THE DRAWINGS

FIGS. 7A, 7B, 7C and 7D are section views showing schematic representations of the process steps involved in using the invention to make a structural prototype part;

FIGS. 8A, 8B, 8C and 8D are schematic representations of the use of the invention to make a mold for molding a prototype part; and FIG. 9 is a perspective view of the prototype part molded from the mold of FIGS. 8A–8D.

EXAMPLES AND USING THE PROCESS TO MAKE A PROTOTYPE PART

Figure 1:
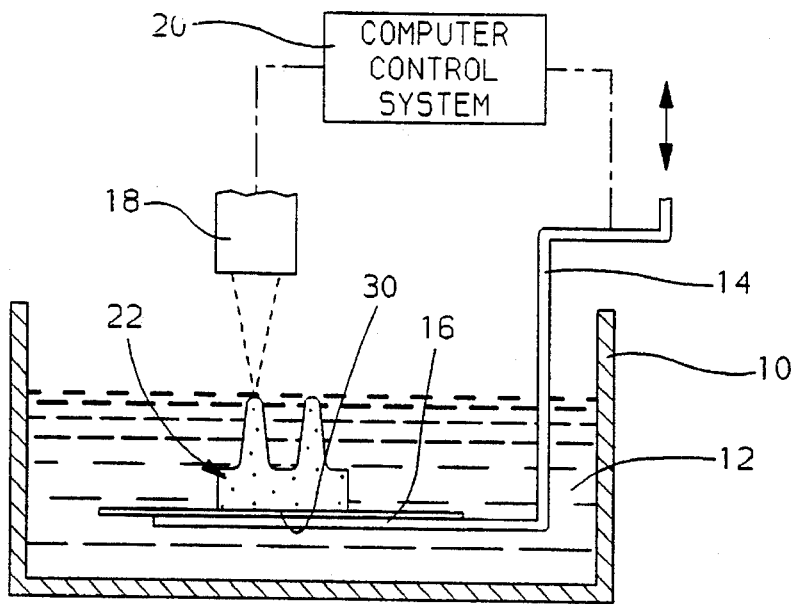
FIG. 1 is a schematic view showing the prior art apparatus for producing a three dimensional object by stereolithography.

Referring to FIG. 1, there is shown a conventional apparatus for making stereolithography resin models. The apparatus includes a vat 10 filled with a suitable liquid plastic resin 12. An elevator 14 carries a platform 16 which can be raised and lowered in the resin vat 10. A laser 18 is suspended above the vat 10 by a suitable mounting device which transverses the laser beam back and forth across the vat 10. A computer control system 20 contains the desired end shape of the resin model 22 and controls both the laser beam and the elevator 14. The elevator 14 starts out at the surface of the resin and is progressively lowered as the laser beam traverses back and forth curing small layers of resin to provide step-wise laminar build-up of the shape of the desired part. When the final shape has been formed, as shown in FIG. 1, the elevator 14 is lifted to raise the resin model 22 above the level of the vat.

Figure 2:
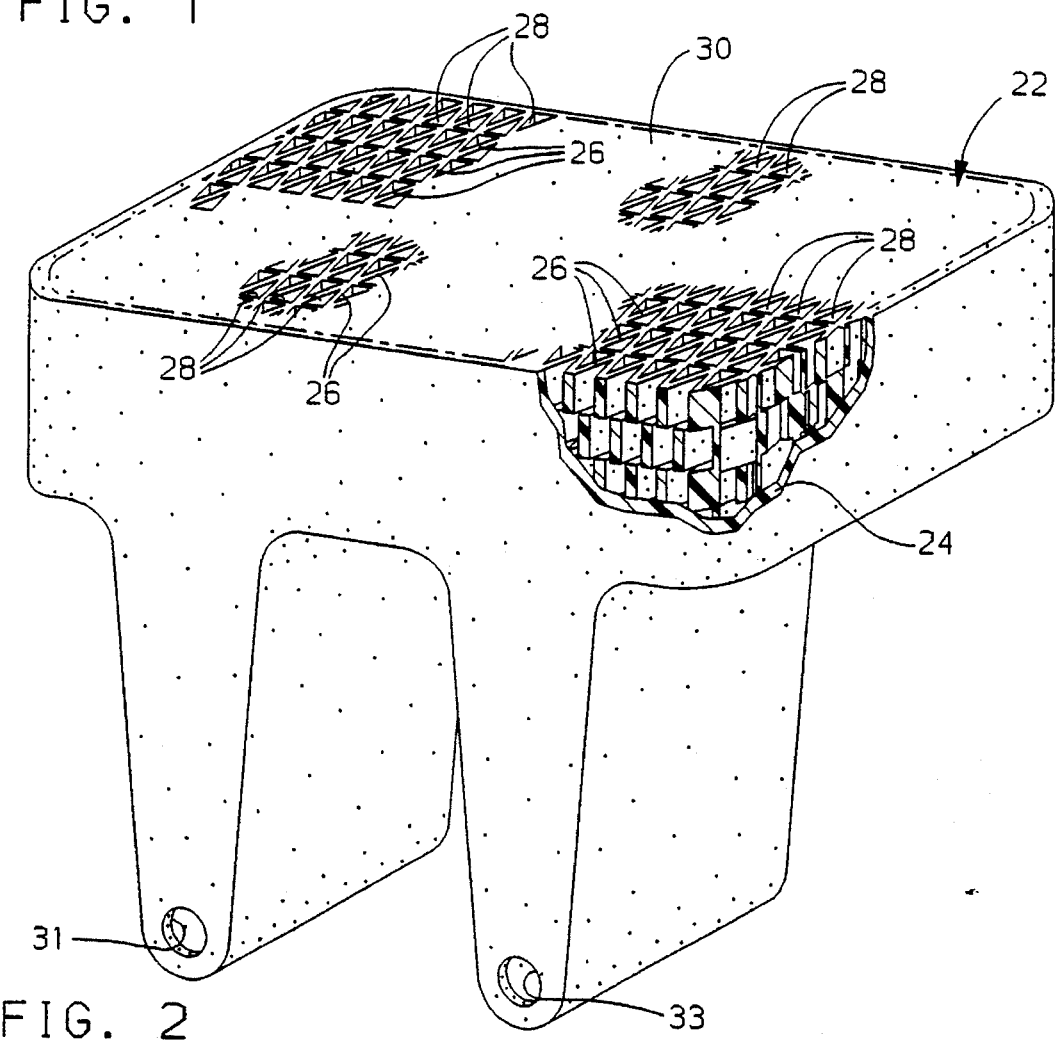
FIG. 2 is a perspective view of a resin model of a prototype part which has been produced in the apparatus of FIG. 1 and is broken away to show the internal structure of the resin model including walls, thin supports, drain channels and vents.

In conventional stereolithography, the model 22 is a solid resin model. However, recent developments in the field of stereolithography have introduced the idea of an improved model which can be more rapidly constructed by forming the model 22 comprised of a smooth and continuous outer wall 24, as shown in FIG. 2, supported by a network of thin supporting walls 26 which overlie and intersect one another to provide a rigid egg crate type structure for support of the outer wall 24. The thin supports 26 define therebetween a network of interconnected voids 28. This structure is more rapid to form because less of the resin material needs to be cured.

As seen in FIG. 2, the upper surface 30 of the model 22 has been formed without an outer skin so that the voids 28 between the thin supports wall 26 remain open and unobstructed.

Referring again to FIG. 1, it is seen that the open face 30 of the model 22 faces downwardly during the stereolithography process. In this way, as soon as the elevator 14 is raised out of the vat 10, the uncured resin can readily drain out of the model 22, leaving behind the cured portions which define the outer wall 24 and the support members 26. In order to further promote the draining, vent holes 31 and 33 may be provided at a suitable location in the model 22, preferably at a spacing which is furthest away from the open end of the voids 28 at the open face 30.

Figure 3:
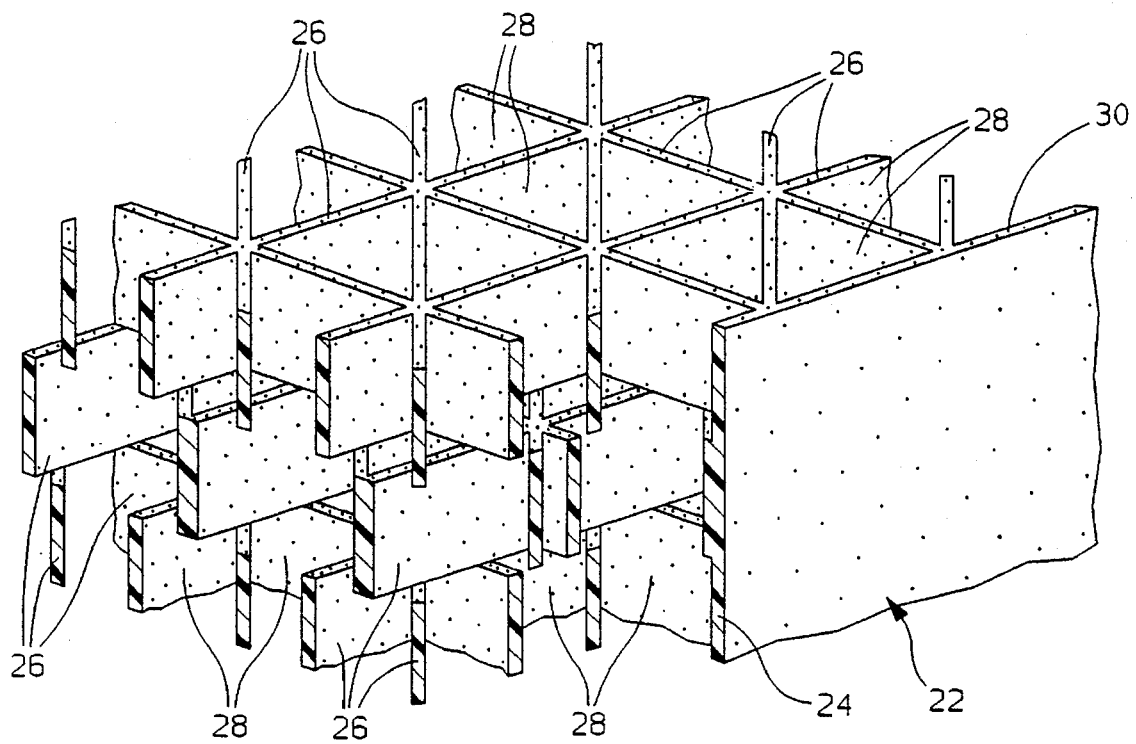
FIG. 3 is an enlarged fragmentary view of the resin model of FIG. 2.

FIG. 3 is an enlarged fragmentary view of FIG. 2, showing the outer wall 24 and the upper face 30, thin supports 26, and voids 28. In FIG. 3 it is seen that the thin supports 26 are arranged triangularly and stacked in offset layers so that the voids 28 communicate with one another throughout the resin model 22. Thus, the interconnecting communication between the voids 28 will promote and assure the thorough draining of the uncured resin from the model 22.

Figure 4:
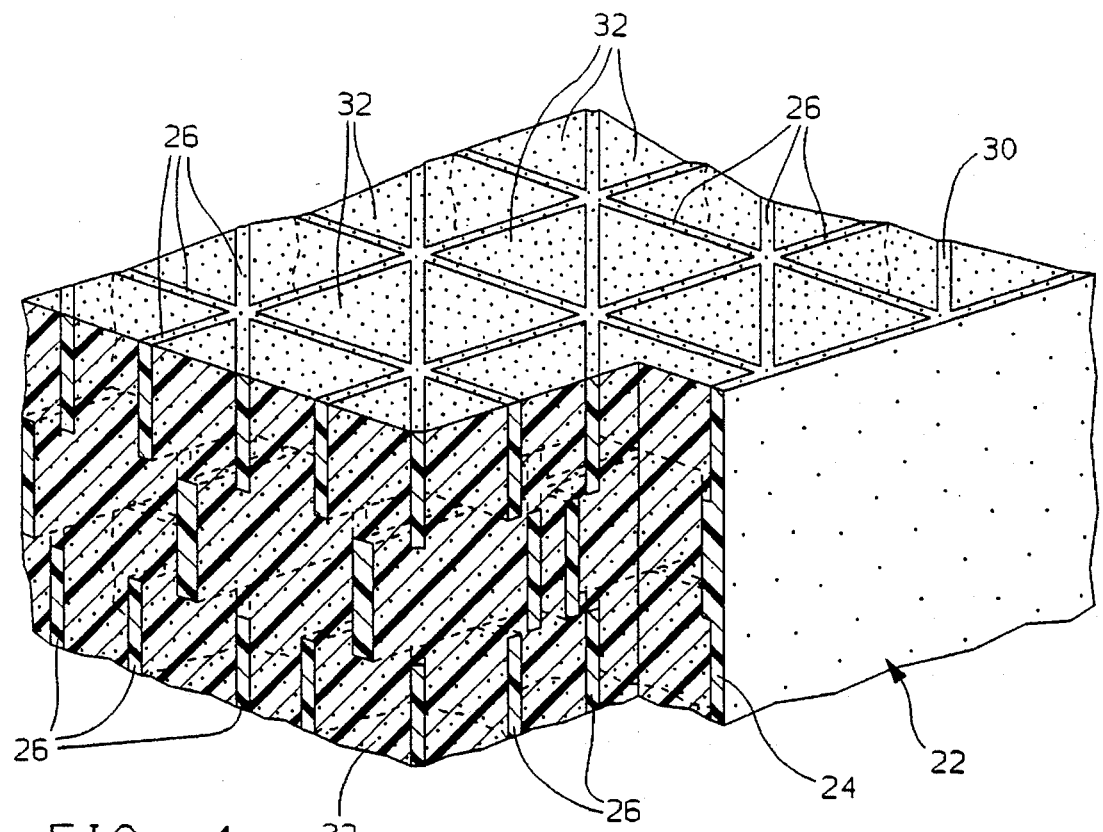
FIG. 4 is a view similar to FIG. 3, but showing the channels having been filled with a hardenable material.

FIG. 4 shows the resin model 22 having been filled with a suitable hardenable material 32 such as a mixture of powdered graphite and resin. As seen in FIG. 4, this hardenable material 32 flows into each of the voids 28 and provides a high strength, interconnecting structure which substantially increases the strength of the resin model 22.

Figure 5:
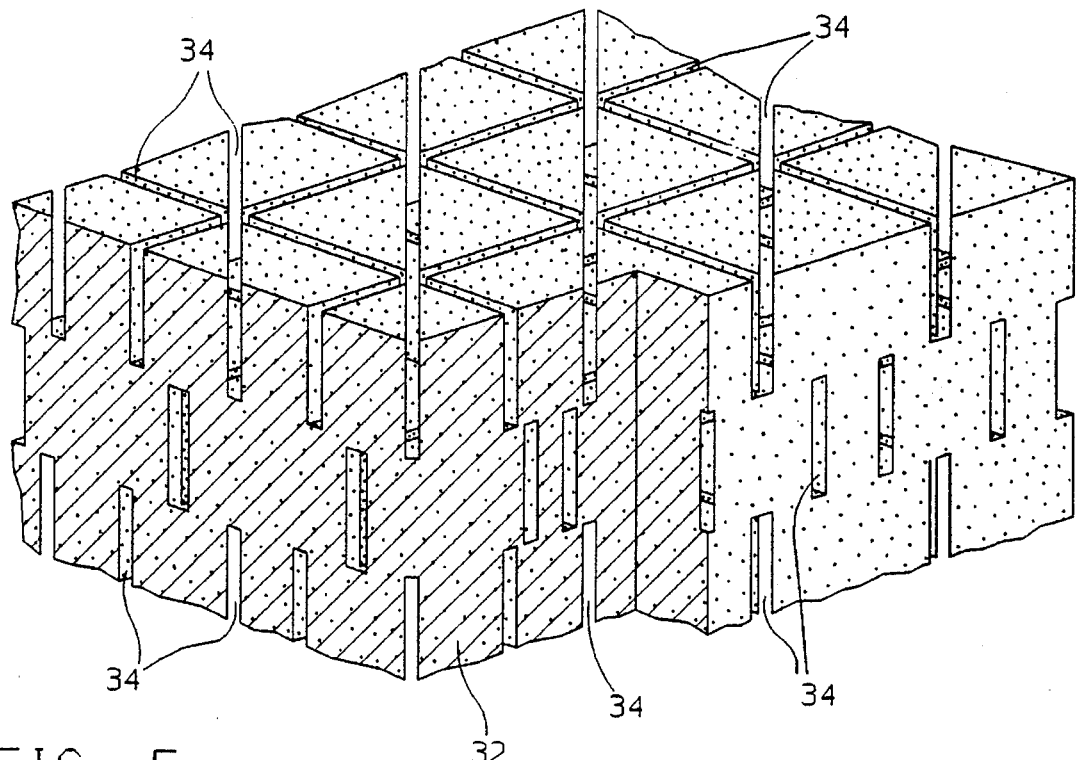
FIG. 5 shows the model of FIG. 4 with the resin proportion thereof having been burned away to leave the prototype part having channels therein where the resin had been.

FIG. 5 shows the model 22 having been heated in a furnace at a temperature which melts or burns away the resin material of the resin model 22. Accordingly, both the outer wall 24 and the thin supports 26 are burned away, leaving the graphite resin hardenable material 32 in place with only relatively thin channels 34 remaining in those locations evacuated by the burning away of the resin supports 26. Because the outer wall 24 is burned away, it may be necessary to make the resin model 22 oversized by an extent equal to the thickness of the outer wall.

Figure 6:
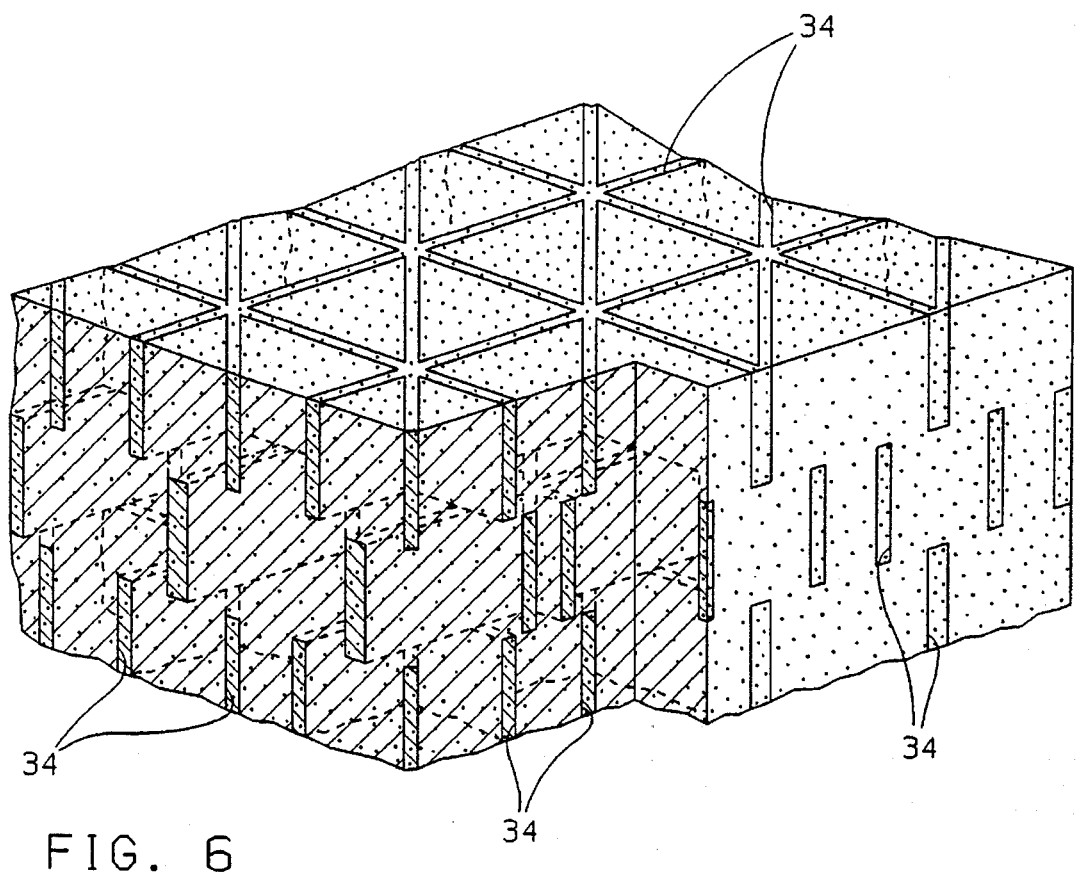
FIG. 6 is similar to FIG. 5, but shows the channels of FIG. 5 having been filled in with a suitable hardenable material.

Referring to FIG. 6, it will be understood that the model 22 can then be further reinforced and strengthened by backfilling the channels 34 with suitable hardenable material, such as the same graphite and resin mixture.

Accordingly, it is understood that the invention has provided capability for making prototype parts having various characteristics of surface finish and strengths. In FIG. 3, the resin model 22 has a relatively smooth outer wall 24 but is of relatively low strength. In FIG. 4, the filling of the resin model 22 of FIG. 3 with a hardenable material provides a model with a smooth outer surface and additional strength. In FIG. 5, the resin has been burned away in a furnace which has simultaneously cured the graphite and resin mixture to provide additional strength, although the outer surface of the resin has been burned away to leave the channels where the resin has been removed so that the outer surface is not smooth because it is interrupted by the channels 34. In FIG. 6 the model of FIG. 5 is even further strengthened by backfilling the channels 34 evacuated by the resin and the model also has a smooth outer surface provided by filling the channels 34.

A suitable graphite material for use in conjunction with this process is known as EDM-2, sold by Poco Graphites, Inc., a Unocal Company, Decatur, Tex. A suitable resin for binding the graphite is TDT 177-114 Epoxy Binder, sold by Ciba Geigy Corporation, Formulated Systems Group, East Lansing, Mich. This resin is hardened by Ciba Geigy Hardeners RP 3209-2 and RR 3209-1 mixed in a 2.2:1 ratio. This mixture of graphite material and epoxy resin is mixed to a pourable consistency for pouring into the voids and channels of the resin model and is curable at room temperature.

The following are examples for use of the invention, particularly with reference to the schematic representations of FIGS. 7A–7D and 8A–8D.

EXAMPLE 1

Make the resin model of FIG. 2 with wall 24 and thin support walls 26 which define voids 28. The voids 28 permit draining of uncured resin from the model when the model is lifted from the vat 10 of FIG. 1. The resin model is then turned upside down to the position of FIG. 7A and a slurry 50 of graphite and resin or a slurry of metal powder and resin is poured into the voids 28 as shown schematically in FIG. 7B.

The hardenable material can be chosen to cure at room temperature or at other temperatures lower than the melting point of the resin from which the model 22 was formed. Accordingly, curing of the filler material leaves the prototype part shown in FIG. 4.

EXAMPLE 2

The prototype part is constructed according to the steps of Example 1. However, the heating of the model in the furnace will assure hardening of the hardenable material and also burn away the resin material of the stereolithography model to provide the open face structure of FIG. 5. This is shown schematically in FIG. 7C.

EXAMPLE 3

The porous model of Example 2 can be further strengthened by pouring a low temperature curable slurry into the channels 34 where the resin burned away. Plaster or other low strength material is used if strength is not needed, but the plaster is effective to provide a smooth outer surface. Added strength is obtained by using a stronger resin material.

EXAMPLE 4

Instead of graphite resin, a metal ingot 52, such as copper, is placed on top of the resin model 22 and heated in a furnace to diffuse the copper into the resin model 22. This is shown schematically in FIG. 7D.

EXAMPLES OF USING THE PROCESS TO MAKE A MOLD

FIG. 8A shows a pair of mold halves which have been already formed of resin using the stereolithography process of FIG. 1. The molds halves 40 and 42 are then inverted as shown in FIG. 8B and a slurry 52 of hardenable material is then poured into the open face of the resin models 40 and 42, as shown schematically in FIG. 8B, thus providing the solid structures of FIGS. 4 and 8C. The mold halves 40 and 42 are then assembled together as shown in 8D and the injection molding material or other hardenable material is introduced into the mold to make the prototype part 54 of FIG. 9.

The hardenable material is preferably chosen to provide a suitable level of strength and temperature resistance to enable the mold to sustain its shape under the pressure and temperature of the mold material to be injected or poured into the mold. The mold can be further strengthened, if needed, by burning away the resin model 22 and back-filling the remaining channels 34 with suitable hardenable material.

Thus, it is seen that this invention provides a new and improved method for making a structural prototype part and a mold.

What is claimed is:

1. Method of making a structural component part comprising the steps of:
   a. creating a cured resin model of the part having a network of interconnected supporting members defining the shape of the part and leaving voids between the supporting members to drain away uncured resin;
   b. infiltrating a hardenable structural material into the voids; and
   c. curing the hardenable structural material so that the model is reinforced to provide a structural component part.

2. The method of claim 1 in which the hardenable structural material is a mixture of powdered graphite and resin which is cured by heat.

3. The method of claim 1 in which the hardenable material is heat cured and the heat is also sufficient to burn away the cured resin of the model so that the component part is then comprised of the hardened structural material having a network of channels therein where the cured resin of the model has been burned away.

4. The method of claim 3 in which the model is further strengthened and the surface thereof finished by filling the network of channels remaining where the cured resin was burned away with a hardenable material.

5. The method of making a mold to be used in making a molded component, comprising the steps of:
   a. using stereolithography to create a cured resin model of the intended mold and define in the model a mold cavity having the shape of the molded component, said model having a network of supporting members defining the shape of the model and leaving voids between the supporting members to drain away uncured resin;
   b. infiltrating a hardenable structural material into the voids of the model; and
   c. curing the hardenable structural material so that the model is reinforced, whereby a mold is made having sufficient strength to receive molten material.

6. The method of claim 5 in which the hardenable structural material is a mixture of powdered graphite and resin which is cured by heat.

7. The method of claim 6 in which the hardenable material is heat cured and the heat is also sufficient to burn away the cured resin of the model so that the component part is then comprised of the hardened structural material having a network of channels therein where the cured resin of the model has been burned away.

8. The method of claim 7 in which the model is further strengthened and the surface thereof finished by filling the network of channels remaining where the cured resin was burned away with a hardenable material.

* * * * *